United States Patent
Troscinski et al.

[11] 3,724,551
[45] Apr. 3, 1973

[54] SECONDARY RECOVERY OF PETROLEUM

[73] Inventors: Edwin S. Troscinski, Houston; James R. Stanford, Sugar Land, both of Tex.

[73] Assignee: Nalco Chemical Company, Chicago, Ill.

[22] Filed: Jan. 6, 1972

[21] Appl. No.: 215,897

[52] U.S. Cl. ............................. 166/295, 166/305 R
[51] Int. Cl. ..................................... E21b 33/138
[58] Field of Search ... 166/295, 294, 305 R, 273, 274

[56] References Cited

UNITED STATES PATENTS

| | | | |
|---|---|---|---|
| 3,087,543 | 4/1963 | Arendt | 166/295 |
| 3,251,414 | 5/1966 | Willman | 166/294 X |
| 3,308,885 | 3/1967 | Sandiford | 166/295 |
| 3,421,582 | 1/1969 | Fallgatter | 166/273 |
| 3,437,141 | 4/1969 | Brandner et al. | 166/273 |
| 3,483,927 | 12/1969 | Nimerick et al. | 166/294 |
| 3,700,031 | 10/1972 | Germer, Jr. et al. | 166/305 R X |

Primary Examiner—Stephen J. Novosad
Attorney—John G. Premo et al.

[57] ABSTRACT

This invention relates to the recovery of petroleum, and in particular, involves a process for reducing the amount of water recovered from a producing well. This reduction in water is accomplished by:

A. introducing a brine solution containing from 0.5 to 5.0 percent by weight of a surfactant into said producing well which penetrates said formation; then;

B. introducing a water-in-oil emulsion into said producing well which penetrates said formation, and allowing the water-in-oil emulsion to be left static for from 10 to 72 hours; said emulsion containing dispersed therein from 0.01 to 35 percent by weight of a finely-divided water-soluble vinyl addition polymer and which is capable of being inverted in water whereby the water-soluble vinyl addition polymer is released into the water as a solution.

9 Claims, No Drawings

SECONDARY RECOVERY OF PETROLEUM

INTRODUCTION

Many producing oil wells yield not only crude oil but also large quantities of water. This mixture of oil and water requires that the oil be separated from the water prior to its being transported to storage areas, shipping facilities, and subsequently into the refineries for the production of petroleum products and petrochemicals.

Water is frequently associated with crude oil when the producing well is part of a water flooding operation which is commonly referred to as a secondary recovery producing well. Also many producing wells either when first brought in or over a period of time tend to yield large volumes of water in relation to the amount of oil removed therefrom.

In the following U.S. Patents: 3,087,543; 3,308,885; and 3,409,548, there is disclosed the technique for removing the amount of water which emanates from producing wells. All of these patents teach the concept of adding to the producing well certain water-soluble polymers which enter the producing formation and seal off the water which effectuates a greater volume of oil to water which enters a producing well.

While the techniques taught in these patents have met with some limited success, they are not entirely satisfactory. One of the major problems associated with treating producing wells with these water-soluble polymers is that they do not sufficiently penetrate the surrounding formation to effectively seal off fissures and crevices from which a large quantity of water emanates.

The present invention is based upon the discovery of a process for reducing the amount of water removed from a producing well in a subterranean oil-bearing formation which comprises the following steps:

A. introducing a brine solution containing from 0.5 to 5.0 percent by weight of a surfactant into said producing well which penetrates said formation; then;

B. introducing a water-in-oil emulsion into said producing well which penetrates said formation, and allowing the water-in-oil emulsion to be left static for from 10 to 72 hours; said emulsion containing dispersed therein from 0.01 to 35 percent by weight of a finely-divided water-soluble vinyl addition polymer and which is capable of being inverted in water whereby the water-soluble vinyl addition polymer is released into the water as a solution.

The result of this process is that the area surrounding the producing well as well as the inner portions of the subterranean formation are plugged with a polymeric substance. This phenomenon is due to the fact that emulsion containing the water-soluble vinyl addition polymer is capable of being inverted in water containing surfactant whereby the water-soluble vinyl addition polymer is released into water as a solution. This results in an uniformly viscous solution in the area of high permeability.

OBJECTS

It is an object of this invention to increase the oil to water ratio from subterranean formations.

It also is an object of this invention to provide a water-in-oil emulsion which contains dispersed therein a finely-divided water-soluble vinyl addition polymer which emulsion is capable of being inverted in water containing a surfactant whereby the water-soluble vinyl addition polymer is released into water as a solution for recovering petroleum from a subterranean oil-bearing formation.

Further objects will appear hereinafter.

THE INVENTION

This invention relates to a process for reducing the amount of water removed from a producing well in a subterranean oil-bearing formation which comprises the following steps:

A. introducing a brine solution containing from 0.5 to 5.0 percent by weight of a surfactant into said producing well which penetrates said formation; then;

B. introducing a water-in-oil emulsion into said producing well which penetrates said formation, and allowing the water-in-oil emulsion to be left static for from 10 to 72 hours; said emulsion containing dispersed therein from 0.01 to 35 percent by weight of a finely-divided water-soluble vinyl addition polymer and which is capable of being inverted in water whereby the water-soluble vinyl addition polymer is released into the water as a solution.

The emulsion contains dispersed therein from 0.01 to 35 percent by weight of a finely-divided water-soluble vinyl addition polymer and is characterized as capable of being inverted in water whereby the water-soluble vinyl addition polymer is released into the water containing a surfactant as a solution.

As mentioned above, the brine solution containing the surfactant is pumped into the producing well and penetrates the formation. The water-in-oil emulsion is then pumped into the producing well. Once in the formation the water-in-oil emulsion contacts the brine containing surfactant and the emulsion is inverted and the polymer released into solution. The emulsion is allowed to be left static for from 10 to 72 hours to allow sufficient time for the water-in-oil emulsion to completely invert and the polymer released into solution.

The water-in-oil emulsion is generally prepared by diluting a polymeric latex concentrate with an organic liquid.

THE POLYMERIC LATEX CONCENTRATE

The polymeric latex concentrate may be prepared by any number of known techniques. The oils used in preparing these emulsions may be selected from a large group of organic liquids which include liquid hydrocarbons and substituted liquid hydrocarbons.

A preferred group of organic liquids are the hydrocarbon liquids which include both aromatic and aliphatic compounds. Thus, such organic hydrocarbon liquids as benzene, xylene, toluene, mineral oils, kerosenes, naphthas and, in certain instances, petrolatums may be used. A particularly useful oil from the standpoint of its physical and chemical properties is the branch-chain isoparaffinic solvent sold by Humble Oil & Refining Co. under the Tradename "ISOPAR M". Typical specifications of this narrow-cut isoparaffinic solvent are set forth below in TABLE I:

TABLE I

Specification
Properties    Minimum  Maximum  Test Method

| | | | |
|---|---|---|---|
| Gravity, API at 60/60°F | 48.0 | 51.0 | ASTM D 287 |
| Color, Saybolt | 30 | | ASTM D 156 |
| Aniline point, °F | 185 | | ASTM D 611 |
| Sulfur, ppm | | 10 | ASTM D 1266 (Nephelometric mod.) |
| Distillation, °F | | | ASTM D 86 |
| IBP | 400 | 410 | |
| Dry point | | 495 | |
| Flash point, °F(Pensky-Martens closed cup) | | 160 | ASTM D 93 |

The amount of oil used in relation to the water to prepare the emulsion may be varied over wide ranges. As a general rule, the amount of oil-to-water may vary between 5:1 to 1:10 with preferable emulsions being prepared in the ratio of 1:2 to 1:10. These ratios are illustrative of emulsions that can be prepared, although it should be understood that the invention is not limited thereby.

The emulsions may be prepared by any number of techniques. For example, the emulsions may be prepared by using high speed agitation or ultrasonic techniques. In most instances, however, it is desirable that the emulsion be a stable emulsion and to achieve this end it is often necessary to employ an oil-soluble emulsifying agent. The amount of emulsifying agent to provide an emulsion will have to be determined by routine experimentation. As a general rule it may be said that the amount of oil-soluble emulsifier may range from 0.1 to 30 percent by weight based on the weight of the oil. To produce stable emulsions the amount of emulsifier will normally be within the range of 12 to 20 by weight of the oil.

Rather than provide a listing of suitable emulsifiers, it is preferred to generally recommend as being satisfactory the so-called low HLB materials which are well documented in the literature and are summarized in the Atlas HLB Surfactant Selector. Although these emulsifiers are useful in producing good water-in-oil emulsions, other surfactants may be used as long as they are capable of producing these emulsions. For instance, it has been found that certain high HLB surfactants are capable of producing stable water-in-oil emulsions. A typical low HLB emulsifier is sorbitan monooleate.

DISPERSING THE POLYMERS INTO THE WATER-IN-OIL EMULSIONS

In accordance with the first step or procedure of the invention, the water-soluble vinyl addition polymers are dispersed into the water-in-oil emulsion. The polymers as produced by most manufacturing processes are in the form of powders of lump-like agglomerates of varying particle size. It is desirable that the particles, before being placed into the emulsion, be comminuted by grinding, abrading or the like so that their average particle size is less than 5 millimeters and preferably is within the range of 1 to 5 microns. After the powders have been comminuted, they may be dispersed into the water-in-oil emulsion by means of agitation provided by such devices as stirrers, shakers, homogenizers and the like. To be commercially practical, the amount of polymer in the emulsion should be at least 2 percent by weight. The invention contemplates using emulsions containing between 5 and 75 percent by weight with preferred emulsions having a polymer concentration within the range of 10 to 45 percent by weight. In some cases the starting emulsions are converted to suspensions due to the nature and the amount of the polymer present therein.

The method of preparing a water-in-oil emulsion by the use of a homogenization device is quite simple. Water is added with agitation to an oil-emulsifier mixture to make an emulsion. The finely-divided polymer particles are then added to the emulsion with rapid agitation. The particle size of the polymer should be within the range of 1 micron to about 5 microns. This suspension of polymer particles in the emulsion is passed through a homogenizer. The amount of pressure necessary to produce a smooth emulsion varies in each experiment. The minimum pressure requirement is a function of the abrasiveness of the polymer, the concentration of the polymer and the particle size of the polymer. In general, the pressure requirement is between 1,000 and 3,000 psi. However, depending upon those variable listed, the pressure requirement could be lower or exceed the stated range. A typical homogenizer device is the Manton-Gaulin type.

From a commercial standpoint it is beneficial that the polymer emulsions thus described be stable, yet at the same time contain relatively large amounts of polymers. One method of insuring that the polymers do not precipitate when dispersed in the emulsion is that the particle size of the polymer be as small as possible. Thus polymer dispersed in the emulsifiers are quite stable when the particle size is within the range of 5 millimicrons up to about 5 microns. To produce particle sizes within these limitations, spray dryers with appropriate size nozzles may be used. It also is possible to prepare the polymer-containing emulsion of the water-soluble vinyl addition polymers directly from the vinyl monomers from which these polymers are synthesized. Such polymer-containing emulsion may be synthesized by using the water-in-oil emulsion polymerization technique set forth in U.S. Pat. No. 3,284,393. The teachings of this patent comprise forming a water-in-oil emulsion of water-soluble ethylenic unsaturated monomers. The emulsion is formed by utilizing a water-in-oil emulsifying agent. To this monomer is added a free radical-type polymerization catalyst and then heat is applied under free radical-forming conditions to form water-soluble polymer latices. The polymeric latex concentrates produced by this patent are relatively unstable and frequently must be treated with additional emulsifiers to render the products stable.

THE WATER-SOLUBLE VINYL ADDITION POLYMERS

These polymers are well known to the art and have been described in numerous publications and patents. The polymers most commonly used in many industrial applications are acrylamide polymers which include polyacrylamide and its water-soluble copolymeric derivatives such as, for instance, acrylamide-acrylic acid, and acrylamide-acrylic acid salt copolymers which contain from about 95 to 5 percent by weight of acrylamide. Also useful are copolymers of acrylamide with other vinyl monomers such as maleic anhydride, acrylonitrile, styrene and the like. It is preferred in the practice of this invention to use acrylamide polymers which are water-soluble and which contain at least 5 percent by weight of acrylamide.

A preferred water-soluble vinyl addition polymer of this invention is polyacrylamide. Another preferred polymer is a copolymer of acrylamide and acrylic acid wherein the acrylic acid component is from 0.8 to 70 percent by weight and the acrylamide component is from 30 to 99.2 percent by weight. The preferred ratio of acrylamide to acrylic acid is 65:35. The copolymer of acrylamide-methacrylic acid having a ratio of 93:7 and a copolymer of acrylamide-dimethylaminoethyl methacrylate (DMAEM) having a ratio of 75:25 are also preferred compositions.

Other water-soluble vinyl polymers are described in detail in the following U.S. Patents: 3,418,237; 3,259,570 and 3,171,805.

In examining the disclosures of these patents it will be seen that the water-soluble polymers may be either cationic or anionic and, in some instances, the ionic charges are sufficiently slight so that the polymers may be considered as nonionic.

For example, water-soluble polymers and copolymers of allyl, diallyl amines, or dimethylaminoethyl methacrylate are cationic. Polymers such as polyvinyl alcohol are nonionic, and polymers such as polyacrylic acid or polystyrene sulfonates are anionic. All of these polymers may be used in the practice of the invention.

The molecular weight of the polymers described above may vary over a wide range, e.g., 10,000 to 25,000,000. The invention, however, finds its greatest usefulness in preparing aqueous solutions or dispersions of these polymers and, in particular, acrylamide polymers whose molecular weight are in excess of 1,000,000. Polymers having higher molecular weights are more difficulty dissolved in water and tend to form extremely viscous solutions at relatively low concentrations. Also, the polymers may be produced by any known methods of conducting polymerization reactions. Thus, solution suspension or emulsion polymerization techniques may be used.

THE ORGANIC LIQUID

Generally, the polymeric latex concentrate will be diluted with an organic liquid just prior to use. As mentioned above, the preferred polymeric latex concentration will have from 20 to 50 percent by weight of a water-soluble vinyl addition polymer. In this application, the polymeric latex concentrate will be diluted with the organic liquid so that the water-in-oil emulsion will have 0.1 to 10 percent by weight of the water-soluble vinyl addition polymer.

The polymeric latex concentrate can be diluted with the organic liquid (including crude oil) near the location of the well where it is to be used. This on-site dilution procedure may be performed in a mixing tank near the well location and then be pumped directly into the well. The organic liquids of this invention include both aromatic and aliphatic hydrocarbon compounds. Thus, such organic hydrocarbon liquids as benzene, xylene, toluene, mineral oils kerosene, naphthas and petroleums may be used. In particular, the petroleum recovered from the operation (crude oil) may be used to dilute the polymeric latex concentration for use. The use of petroleum obtained from the operation eliminates the burdensome problems in handling other organic liquids but also results in a great decrease in cost.

Once diluted, the polymeric latex concentrate can be considered to be crude oil or a hydrocarbon containing a polymer emulsion which is to be injected into he producing well.

Oftentimes it is desirable to use a more concentrated medium than the ones as defined above. If such is the case the polymeric latex concentrate may be used without dilution with an organic liquid. If such is the case the polymeric latex concentrate would be pumped directly into the well without any type of dilution.

In general the polymeric latex concentrate will have a composition as follows:

A. water ranging between 5 and 25 percent by weight;

B. a water-soluble vinyl addition polymer having a concentration between 20 and 50 percent by weight;

C. a hydrophobic liquid ranging between 5 and 35 percent by weight;

D. a water-in-oil emulsifying agent having a concentration between 0.1 and 30 percent by weight.

The polymeric latex upon dilution will have a composition as follows:

A. water ranging between 0.1 and 25 percent by weight;

B. a water-soluble vinyl addition polymer having a concentration between 0.1 and 35 percent by weight;

C. a hydrophobic liquid ranging between 5 and 99 percent by weight;

D. a water-in-oil emulsifying agent having a concentration between 0.001 and 30 percent by weight.

THE BRINE SOLUTION

The brine solution which contains the surfactant that is injected into the well is generally brine which was recovered from producing oil wells. This brine solution is readily available at little or no cost. The surfactant is added to the brine solution in a concentration from 0.5 to 5.0 percent by weight.

The major discovery upon which this invention is predicated resides in the discovery that when the crude oil containing the water-in-oil emulsion is contacted with the brine containing surfactant the emulsion is inverted in the subterranean formation and the polymer goes into solution forming an uniformly viscous solution in the formation. The rate at which this occurs may be controlled by the type and amount of emulsifier used to prepare the polymer system. The polymer-containing emulsions release the polymer in water after a period of time in such a manner as to avoid the dissolution problem of the prior art. Thus, when the water-in-oil emulsion is pumped into a producing well it will mix with water in the subterranean formation at which time the polymer will be released forming a viscous polymeric solution.

It is preferred that once the crude oil containing the emulsion is introduced into the formation that the emulsion be left static for from 10 to 72 hours. This period of time has been found to be sufficient to completely invert the emulsion and release the water-soluble vinyl addition polymer into solution. As mentioned above, this time may vary with the composition as well as the rock formation. Thus, it is possible for complete dissolution to occur either more rapidly or more slowly than the preferred time range. It should be stressed that the invention is not limited by the amount of time necessary to dissolve the polymer.

THE SURFACTANTS

The preferred surfactants are hydrophylic and are further characterized as being water-soluble. Any hydrophilic-type surfactant such as ethoxylated nonyl phenols, ethoxylated nonyl phenol formaldehyde resin, dioctyl esters of sodium sulfosuccinate, and octyl phenol polyethoxyethanol can be used.

Other surfactants that may be employed include the soaps such as sodium and potassium myristate, laurate, palmitate, oleate, stearate, resinate, and hydroabietate, the alkali metal alkyl or alkylene sulfates, such as sodium lauryl sulfate, potassium stearyl sulfate, the alkali metal alkyl or alkylene sulfonates, such as sodium lauryl sulfonate, potassium stearyl sulfonate, and sodium cetyl sulfonate, sulfonated mineral oil, as well as the ammonium salts thereof; and salts of higher means like lauryl amine hydrochloride, and stearyl amine hydrobromide.

Any anionic, cationic, or nonionic compound can be used as a surfactant.

Following is a list of suitable surfactants that could be used in the practice of this invention. Any water-soluble surfactant could be used, but naturally some are more efficient than others. Useful surfactants include, but are not limited to: polyoxyethylene alkyl phenol, polyoxyethylene (10 mole) cetyl ether, polyoxyethylene alkyl-aryl ether, polyoxyethylene monolaurate, polyoxyethylene vegetable oil, polyoxyethylene sorbitan monolaurate, polyoxyethylene esters or mixed fatty and resin acids, polyoxyethylene sorbitol lanolin derivative, polyoxyethylene (12 mole) tridecyl ether, polyoxyethylene sorbitan esters of mixed fatty and resin acids, polyoxyethylene sorbitan monostearate, polyoxyethylene sorbitan monooleate, polyoxyethylene monostearate, polyoxyethylene (20 mole) stearyl ether, polyoxyethylene (20 mole) oleyl ether, polyoxyethylene (15 mole) tridecyl ether, polyoxyethylene fatty alcohol, polyoxyethylene alkyl amine, polyoxyethylene glycol monopalmitate, polyoxyethylene sorbitan monopalmitate, polyoxyethylene (20 mole) cetyl ether, polyoxyethylene oxypropylene stearate, polyoxyethylene lauryl ether, polyoxyethylene lanolin derivative, sodium oleate, quaternary ammonium derivative, potassium oleate, N-cetyl N-ethyl morpholinium ethosulfate, and pure sodium lauryl sulfate.

In addition to using the water-soluble surfactants described above, other surfactants may be used such as silicones, clays and the like which are included as surfactants since, in certain instances, they tend to invert the emulsion even though they are not water-soluble.

In other specific cases the surfactant may be directly added to the polymer-containing emulsion; thereby rendering it self-inverting upon contact with water. These products, while capable of being used in certain systems, must be carefully formulated since the surfactants may tend to interact with the emulsifier or the emulsion and destroy it prior to its being used.

Other techniques for inverting the emulsions include the use of agitation, heat and pH shift, as well as the placement into the water, into which the polymer-containing emulsion is to be dissolved, certain electrolytes. For any particular polymer-containing emulsion a suitable method for its inversion may be readily determined by routine experimentation.

EXAMPLE I

A Brea Sandstone Core was saturated with 9-pound brine containing 1 percent ethoxylated nonyl phenol. The permeability of the core was calculated to be 73.7 millidarcies (md). A 3 percent solution of an acrylamide polymeric latex in kerosene was then passed through the core displacing the 9-pound brine. More specifically, the polymeric latex consisted of 3 percent by weight of acrylamide, 3 percent by weight of water, 0.05 percent by weight of emulsifier, and 93.95 percent by weight of kerosene. The core was then reversed and permeability to 9-pound brine was determined. The final brine permeability was 82.6 md. The results show that there was ineffective plugging of the core.

EXAMPLE II

The same type core as was used in Example I was saturated with a 9-pound brine again containing 1 percent by weight of ethoxylated nonyl phenol. Permeability of the core was calculated to be 352 md. Approximately one-half pore volume of a 3 percent solution of acrylamide polymeric latex in kerosene was injected into the core. The core was left static for 18 hours. After reversing the core, brine permeability was again determined. The final brine permeability was 1.9 md. The results show that this procedure was very effective in plugging the core.

EXAMPLE III

The core was saturated with a 9-pound brine and the permeability was calculated to be 176. A 0.5 percent solution of dry polyacrylamide dissolved in water was prepared which also contained 0.5 percent ethoxylated nonyl phenol. This solution was injected into the core. The core was then reversed and the permeability of the 9-pound brine was determined to be 36.7 md, thus only partial plugging of the core resulted.

EXAMPLE IV

The core was saturated with a 9-pound brine and the permeability was calculated to be 110 md. A brine solution containing 0.5 percent acrylamide polymer latex and 0.5 ethoxylated nonyl phenol was injected into the core and held for 20 hours. The core was then reversed and permeability again determined. The permeability was found to be 121 md. The results show that there was an ineffective plugging of the core.

CONCLUSIONS

These experimental procedures do indicate that a particular procedure is more likely to be successful as a water shut-off technique in a producing well. This procedure involves passing into the zone to be plugged off a brine solution containing the activator, followed by a diluted polymeric latex solution and then shutting the well in for a period of time to allow the latex to invert.

We claim:

1. A process for reducing the amount of water removed from a producing well in a subterranean oil-bearing formation which comprises the following steps:
    A. introducing a brine solution containing from 0.5 to 5.0 percent by weight of a surfactant into said producing well which penetrates said formation; then;

B. introducing a water-in-oil emulsion into said producing well which penetrates said formation, and allowing the water-in-oil emulsion to be left static for from 10 to 72 hours; said emulsion containing dispersed therein from 0.01 to 35 percent by weight of a finely-divided water-soluble vinyl addition polymer and which is capable of being inverted in water whereby the water-soluble vinyl addition polymer is released into the water as a solution.

2. The process of claim 1 wherein the water-in-oil emulsion is comprised of:
A. water ranging between 0.01 and 25 percent by weight;
B. a water-soluble vinyl addition polymer having a concentration between 0.1 and 35 percent by weight;
C. a hydrophobic liquid ranging between 5 and 99 percent by weight; and
D. a water-in-oil emulsifying agent having a concentration between 0.001 and 30 percent by weight.

3. The process of claim 1 wherein the water-in-oil emulsion is comprised of:
A. water ranging between 5 and 25 percent by weight;
B. a water-soluble vinyl addition polymer having a concentration between 20 and 50 percent by weight;
C. a hydrophobic liquid ranging between 5 and 35 percent by weight; and
D. a water-in-oil emulsifying agent having a concentration between 0.1 and 30 percent by weight.

4. The process of claim 1 wherein the concentration of the water-soluble vinyl addition polymer in the polymeric latex is from 0.1 to 10 percent by weight.

5. The process of claim 1 wherein the polymer is an acrylamide-sodium acrylate copolymer.

6. The process of claim 5 wherein the weight ratio of acrylamide to sodium acrylate is 65:35.

7. The process of claim 1 wherein the polymer is an acrylamide-sodium acrylate copolymer wherein the acrylic acid component is from 0.8 to 70 percent by weight and the acrylamide component is from 30 to 99.2 percent by weight.

8. The process of claim 1 wherein the polymer is polyacrylamide.

9. The process of claim 1 wherein the polymer is an acrylamide-methacrylic acid copolymer.

* * * * *